United States Patent [19]

Larson et al.

[11] Patent Number: 5,285,060

[45] Date of Patent: Feb. 8, 1994

[54] DISPLAY FOR AUTOMATIC REARVIEW MIRROR

[75] Inventors: Mark L. Larson, Grand Haven; Niall R. Lynam, Holland; Kenneth L. Schierbeek, Zeeland, all of Mich.

[73] Assignee: Donnelly Corporation, Holland, Mich.

[21] Appl. No.: 990,517

[22] Filed: Dec. 15, 1992

[51] Int. Cl.$^5$ .............................................. H01J 40/14
[52] U.S. Cl. ............................... 250/214 AL; 315/77; 340/461
[58] Field of Search ............. 250/201.1, 205, 214 AL; 315/77, 82, 155; 340/459, 461

[56] References Cited

U.S. PATENT DOCUMENTS

| | | |
|---|---|---|
| 3,506,229 | 4/1974 | Schoot et al. |
| 3,612,654 | 10/1971 | Klein |
| 3,612,666 | 10/1971 | Rabinow |
| 3,680,951 | 8/1972 | Jordan et al. |
| 3,722,984 | 3/1973 | Brean |
| 3,862,798 | 1/1975 | Hopkins |
| 3,986,022 | 10/1976 | Hyatt |
| 3,992,873 | 11/1976 | Awalt |
| 4,005,928 | 2/1977 | Kmetz et al. |
| 4,097,131 | 6/1978 | Nishiyama |
| 4,165,157 | 8/1979 | Kobale et al. |
| 4,200,361 | 4/1980 | Malvano et al. |
| 4,299,444 | 11/1981 | Romer |
| 4,386,345 | 5/1983 | Narveson et al. |
| 4,388,558 | 6/1983 | Mizuno et al. |
| 4,418,102 | 11/1983 | Ferrato |
| 4,443,057 | 4/1984 | Bauer et al. |
| 4,491,390 | 1/1985 | Tong-Shen |
| 4,521,079 | 6/1985 | Leenhouts et al. |
| 4,572,619 | 2/1986 | Reininger et al. |
| 4,600,273 | 7/1986 | Ohno |
| 4,603,946 | 8/1986 | Kato et al. |

(List continued on next page.)

FOREIGN PATENT DOCUMENTS

| | | |
|---|---|---|
| 0173309 | 3/1986 | European Pat. Off. |
| 2808260 | 8/1979 | Fed. Rep. of Germany |
| 1131236 | 10/1968 | United Kingdom |
| 2156295 | 10/1985 | United Kingdom |

OTHER PUBLICATIONS

Donnelly Electrochromic Mirrors brochure, published Feb. 15, 1990.
Gladstone et al., IBM Technical Disclosure Bulletin, vol. 15, No. 2, Jul., 1972.
Donnelly Compass Mirrors brochure, published Apr. 30, 1989.

*Primary Examiner*—David C. Nelms
*Attorney, Agent, or Firm*—Price, Heneveld, Cooper, DeWitt & Linton

[57] ABSTRACT

A rearview mirror system for a vehicle having a reflective element with a reflective surface and a variable light transmission element includes an optical display device behind the reflective element in order to produce a visual display to the driver. A control is provided having a light sensor that senses light conditions in the vicinity of the vehicle and produces a continuously variable light signal indicative of such sensed light conditions. The control further includes a drive circuit that is responsive to the light signal in order to supply a drive signal to the reflective element and thereby establish the light transmission level of the light transmission element. The control further includes an intensity control circuit that varies the intensity of the optical display as a function of the value of the sensed light in the vicinity of the vehicle in order to accommodate physiological changes in the driver's eyes. The intensity control circuit further varies the intensity of the optical display device as a function of the drive signal supplied to the reflective element in order to compensate for reduced light transmission levels of the light transmission element. The intensity control circuit sums values of the light signal and the drive signal and processes the sum to a pulse-width modulated signal using a non-linear processor. The intensity control also provides a substantially constant high intensity of the optical display device for all values of sensed light above a predetermined high light.

62 Claims, 6 Drawing Sheets

U.S. PATENT DOCUMENTS

| | | |
|---|---|---|
| 4,623,222 | 11/1986 | Itoh et al. . |
| 4,630,904 | 12/1986 | Pastore . |
| 4,632,509 | 12/1986 | Ohmi et al. . |
| 4,640,583 | 2/1987 | Hoshikawa et al. . |
| 4,655,549 | 4/1987 | Suzuki et al. . |
| 4,660,937 | 4/1987 | Richardson . |
| 4,669,825 | 6/1987 | Itoh et al. . |
| 4,669,826 | 6/1987 | Itoh et al. . |
| 4,669,827 | 6/1987 | Fukada et al. . |
| 4,671,615 | 6/1987 | Fukada et al. . |
| 4,676,601 | 6/1987 | Itoh et al. . |
| 4,690,508 | 9/1987 | Jacob . |
| 4,693,558 | 9/1987 | Nakaho et al. . |
| 4,696,548 | 9/1987 | Ueno et al. . |
| 4,701,022 | 10/1987 | Jacob . |
| 4,721,364 | 1/1988 | Itoh et al. . |
| 4,739,226 | 4/1988 | Murata . |
| 4,741,603 | 5/1988 | Miyagi et al. . |
| 4,793,690 | 12/1988 | Gahan et al. . |
| 4,799,768 | 1/1989 | Gahan . |
| 4,855,727 | 8/1989 | Tsuchiya et al. . |
| 4,882,565 | 11/1989 | Gallmeyer . |
| 4,886,960 | 12/1989 | Molyneux et al. . |
| 4,896,030 | 1/1990 | Miyaji . |
| 4,917,477 | 4/1990 | Bechtel et al. . |
| 4,940,315 | 7/1990 | Demiryont . |
| 5,148,014 | 9/1992 | Lynam et al. ................ 250/214 AL |

DISPLAY FOR AUTOMATIC REARVIEW MIRROR

BACKGROUND OF THE INVENTION

This invention relates generally to automatic rearview mirror systems and, more particularly, to such systems incorporating optical display devices within the reflective element in order to display alphanumeric indicators or graphic symbols to the driver.

It has been known to incorporate alphanumeric and graphic displays in vehicle automatic rearview mirror systems. One such example is illustrated in U.S. Pat. No. 4,882,565 issued to W. Gallmeyer for INFORMATION DISPLAY FOR REARVIEW MIRRORS, which is assigned to the assignee of the present application. In the Gallmeyer patent, a plurality of graphic indicia, such as warning signals, are individually displayed near the edge of the reflecting area of the mirror by separately illuminating light emitting diodes (LED) associated with each indicia. Such information displays are also useful for displaying, in either graphic or alphanumeric form, the output of an electronic compass in order to inform the driver of the compass heading of the vehicle. The indicia are etched in the reflective surface of the mirror and a light filter material is provided between the indicia and the light source.

In a copending patent application by Desmond J. O'Farrell and Richard J. Gahan for an ELECTROOPTIC REARVIEW MIRROR WITH LIGHT TRANSMITTING AREA filed on Apr. 27, 1992, Ser. No. 07/874,635, now U.S. Pat. No. 5,253,109, which application is commonly assigned to the present assignee, a portion of the variable reflective element of the automatic rearview mirror, in the vicinity of the display, is maintained in a non-colored state regardless of the state of coloration of the reflective element. In this manner, the intensity of the display placed behind the variable reflective element, as viewed by the driver, is not affected by the light transmission level, or transmissivity, of the electrochromic cell.

It is known to vary the intensity of automobile electronic display systems between a first intensity level for bright ambient light conditions and a second intensity level for dark ambient light conditions. Such intensity variation may be performed by varying the ratio between on and off conditions, or duty cycle, of the display, provided that the switching is sufficiently fast to avoid perception by the human eye. In U.S. Pat. No. 4,388,558 issued to Mizuno et al. the display intensity of an automobile electronic display system is switched between such levels by monitoring the switch used to actuate the vehicle headlights in order to respond to changes in ambient light conditions.

SUMMARY OF THE INVENTION

The present invention is embodied in a rearview mirror system for a vehicle including a reflective element having a reflective surface and a variable light transmission element. A drive circuit is provided for supplying a signal to the reflective element in order to establish the light transmission level of the light transmission element. An optical display device is provided behind the reflective element in order to produce a display. The optical device has an intensity level and is adapted to be viewed through the light transmission element. According to one aspect of the invention, a control is provided having a light sensing means that is responsive to light conditions in the vicinity of the vehicle for producing a continuously variable light signal representative of such light conditions. An intensity control circuit varies the intensity of the optical display device as a function of the value of the light signal. As a result, the intensity of the optical display device is continuously varied in response to any changes in the lighting conditions in the vicinity of the vehicle in order to more appropriately respond to the physiological condition of the driver's eyes.

In a preferred form, the intensity control circuit provides a substantially constant low intensity of the optical display device for all values of sensed light below a first predetermined low light level. This ensures that the display will be visible under all circumstances and will not vary substantially under conditions which may be perceived as unwarranted by the driver's eyes. The intensity control circuit additionally provides a substantially constant high intensity of the optical display device for all values of sensed light above a predetermined high light level. Beyond a given level of light in the vicinity of the vehicle, the driver's eyes will not respond to increasing light levels. Therefore, this aspect of the invention avoids changes in display intensity which may be perceived by the driver.

According to another aspect of the invention, a control is provided for the rearview mirror system that includes an intensity control circuit that varies the intensity of the optical display device as a function of the drive signal supplied to the reflective element. In this manner, the control compensates the intensity of the optical display device for reduced light transmission levels of the light transmission element. This relative independence of display intensity from the coloration of the light transmission element is accomplished without the necessity for providing a clear, non-coloring, portion of the variable reflectance cell. In one form, the intensity control circuit may include a time filter having a time constant that is a function of the response characteristic of the reflective element. In this manner, the intensity of the optical display device may be matched to changes in the light transmission level of the variable light transmission element resulting from changes in value of the drive signal. If this aspect of the invention is applied to an electrochromic element in which the variable light transmission element increases in light transmissivity at a different rate than it decreases in light transmissivity, the time filter may include an asymmetrical time constant.

In a preferred form, the invention may be applied to an automatic rearview mirror system in which the drive circuit for supplying the drive signal to the reflective element in order to establish the light transmission level of the light element includes a light sensor adapted to sensing light in the vicinity of the vehicle for producing a light signal that is representative of the sensed light and means responsive at least in part to the light signal for producing the drive signal. According to this aspect of the invention, a control means is provided which is responsive to a light signal produced by the light sensor and to the drive signal in order to vary the intensity of the optical display device as a function of the value of light sensed by the light sensor and as a function of the light transmission level of the light transmission element.

These and other objects, advantages and features of this invention will become apparent upon review of the following specification in conjunction with the drawings.

DESCRIPTION OF THE PREFERRED EMBODIMENT

Figure 1:
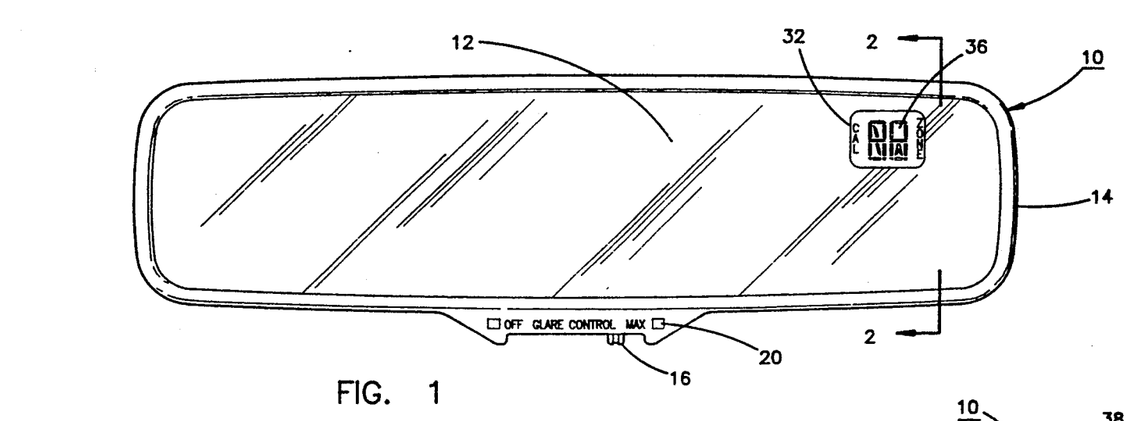
FIG. 1 is a front elevation, as viewed by a driver, of a rearview mirror according to the invention.
Figure 2:
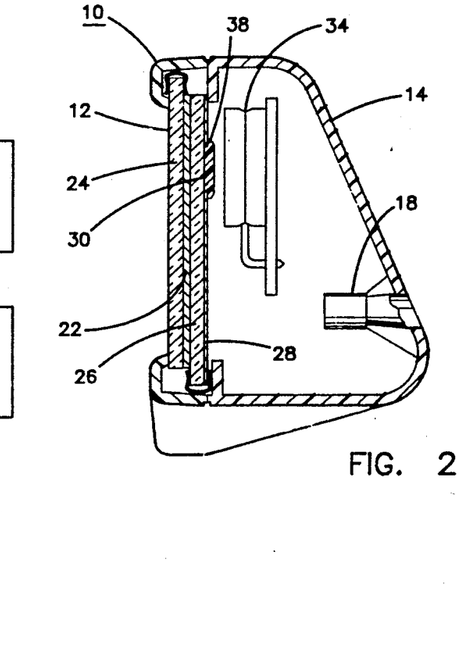
FIG. 2 is a sectional view taken along the lines II-II in FIG. 1.

Referring now specifically to the drawings, and the illustrative embodiments depicted therein, an automatic rearview mirror system 10 includes a variable reflectance level light reflective element 12 positioned within a housing 14 (FIGS. 1 and 2). A user input control device 16 is provided in order to allow the user to adjust the sensitivity of light reflective element 12 to changes in light conditions. In order to establish the light reflectance level of light reflective element 12, a forward-facing light sensor 18 is provided, in order to sense light conditions forward of the vehicle and a rearward-facing light sensor 20 is provided, in order to sense glare light conditions rearward of the vehicle. The variable light reflective element in the illustrated embodiment is an electrochromic element of the electrochemichromic type in which an electrochemichromic material 22 is sandwiched between a transparent outer sheet 24 and an inner sheet 26, such as is described in U.S. Pat. No. 5,140,555 issued to D. V. Varaprasad et al. for HIGH PERFORMANCE ELECTROCHEMICHROMIC SOLUTIONS AND DEVICES THEREOF. A reflective coating 28 is deposited on inner sheet 26 in order to reflect light incident to the light reflective element. Such electrochemichromic reflective elements are well known in the art. Although the invention is illustrated with an electrochemichromic reflective element, it is equally useful with other electrically responsive variable reflective elements, including, but not limited to, all solid-state electrochromic elements and liquid crystal elements.

A portion of reflective coating 28 is removed, or at least partially removed, at 30 in order to establish a partially or fully transmissive portion 32 of variable reflective element 12. A mirror display, such as an optical display element 34, is positioned within housing 14 juxtaposed with transmissive portion 32 such that graphic or alphanumeric symbols 36 may be displayed through variable reflective element 12, as best seen in FIG. 1. A light filtering material 38, such as a dyed polymer or epoxy, is deposited on inner sheet 26 in the area of transmissive portion 32 in order to provide sharp resolution of the symbols 36. Alternatively, a colored sheet of polycarbonate or acrylic may be used. An example of a suitable light filtering material is marketed by Master Bond under Model No. UV15-7LRI colored with a dye marketed by Morton International, Inc. under the mark Morplas Green. In the illustrated embodiment, display element 34 utilizes vacuum fluorescent technology and is preferably a fluorescent indicator panel. Alternatively, optical display device 34 could utilize electroluminescent, light emitting diode (LED), semiconductor laser, incandescent, backlit liquid crystal, cathode ray tube, or other illuminated display technology. Such displays find utility in compass mirrors, information mirrors, hazard warning mirrors and the like and may be applied to both interior and exterior rearview mirrors of the vehicle.

Figure 3:
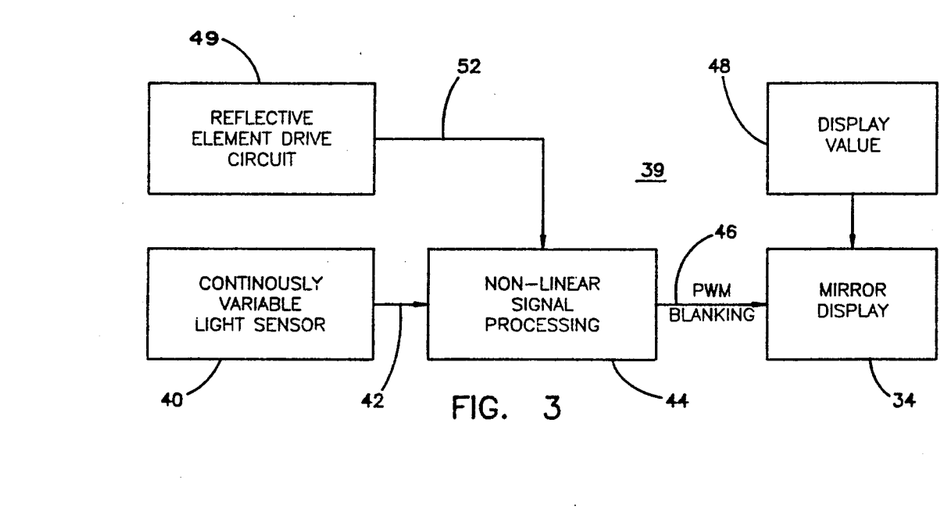
FIG. 3 is a block diagram according to the invention.

A display control circuit 39 includes a light sensor 40 which senses lighting conditions in which the vehicle is present and responds with a continuously variable signal on its output 42 that is a function of such light conditions (FIG. 3). A non-linear signal processing circuit 44 processes the signal on output 42 into a pulse-width modulated blanking signal 46 which is supplied to mirror display 34. The percentage duty cycle of pulse-width modulated signal 46 establishes the intensity of the symbols 36 displayed by mirror display 34. A display driver circuit 48 establishes the identity of the symbols 36, which are displayed on mirror display 34. Non-linear signal processing circuit 44 processes output 42 into pulse-width modulated signal 46 in such a manner that the intensity of the mirror display will remain substantially constant for all values of light sensed by sensor 40 below a first predetermined low light level. Also, signal processing circuit 44 will provide a substantially constant high intensity of display 34 for all values of light sensed by light sensor 40 above a predetermined high light level. For all values of sensed light between these predetermined light levels, signal processing circuit 44 processes output 42 to pulse-width modulated signal 46 in a relatively linear fashion.

Figure 6:
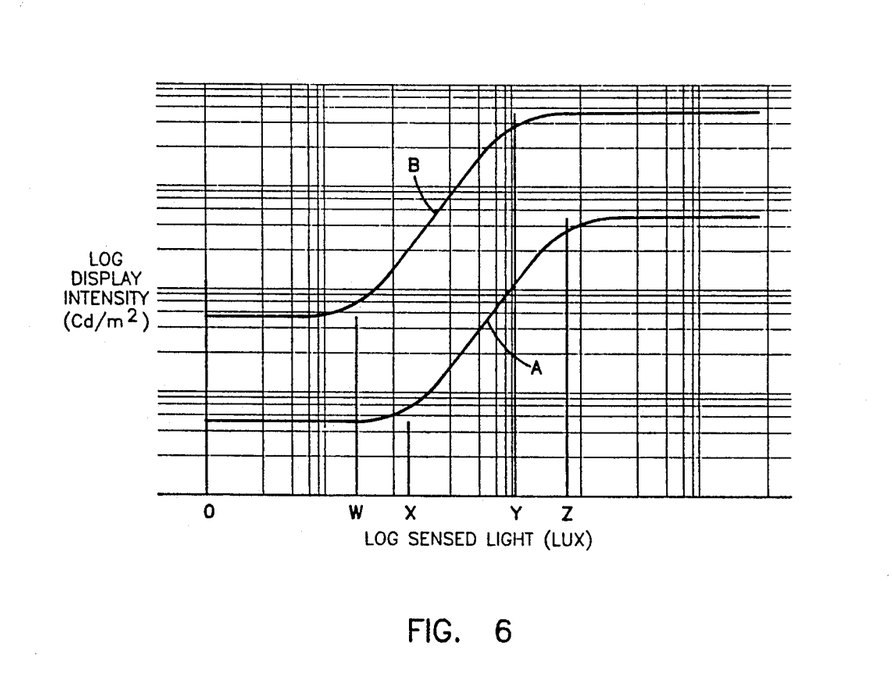
FIG. 6 is a diagram illustrating the relationship between the display intensity and light levels in the vicinity of the vehicle for different light transmission levels of the variable reflective element.

As seen by curve A in FIG. 6, the intensity of the display 34 is relatively constant for sensed light levels illustrated between points 0 and X. This is in order to avoid the driver perceiving noticeable changes in the intensity of the display in light conditions in the vicinity of the vehicle that are so low that the driver's eyes will not respond to further changes in light levels. Furthermore, this provides a minimum intensity of the mirror display 34 so that the display will never become completely darkened. In the illustrated embodiment, pulse-width modulated signal 46 has a minimum duty cycle of approximately 1.6%. In the region of curve A between points X and Z, the logarithm of the intensity of the display varies relatively linearly with the logarithm of the light level sensed by sensor 40. For values of sensed light beyond point Z, the level of the display intensity is relatively constant. This is to avoid the driver perceiving changes in the display intensity in light conditions in the vicinity of the vehicle beyond which the operator's eyes no longer respond to the increased light levels and is a result of limitations of the display brightness.

Display control circuit 39 additionally includes a reflective element drive circuit 49, which produces on output 52 a drive signal which establishes the reflectance level of variable reflective element 12. Non-linear signal processing circuit 44 combines the drive signal on output 52 with the continuously variable light signal on output 42 in a manner that the duty cycle of pulse-width modulated signal 46 is increased as a function of increased values of the drive signal on output 52. This is in order to increase the intensity of mirror display 34 in order to compensate for diminished intensity of the display as a result of coloration of reflective element 12. This may be seen by reference to curve B in FIG. 6, which illustrates the response of non-linear signal processing circuit 44 to sensed light conditions when the reflective element 12 is fully colored by reflective element drive circuit 50. It may be seen that the minimum intensity of display 34, between points O and W, is greater than that for curve A and that the maximum intensity of display 34 beyond point Y is greater than that for curve A. However, when viewed by the driver, the intensity of the mirror display should be approximately the same, for a given sensed light condition, irrespective of the light reflectance level of the reflective element.

Figure 4:
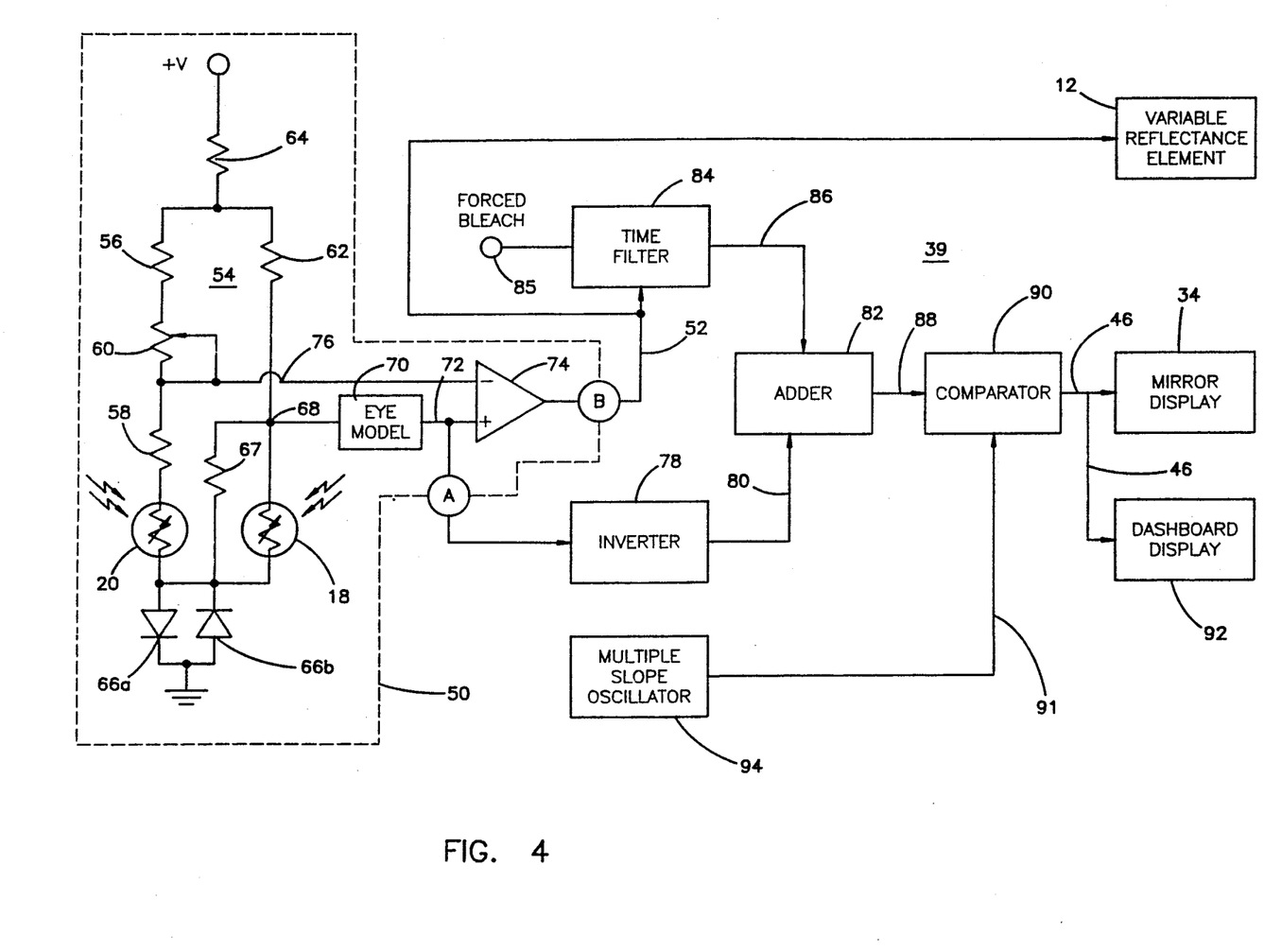
FIG. 4 is a block diagram of a first embodiment of a display control according to the invention.

In the illustrated embodiment, a reflective element drive circuit 50 combines rearward-facing sensor 20 and forward-facing light sensor 18 in a bridge circuit 54, in the manner disclosed in detail in commonly assigned U.S. Pat. No. 4,886,960 issued to Molyneux et al. for a CONTROL CIRCUIT FOR AN AUTOMATIC REARVIEW MIRROR, the disclosure of which is hereby incorporated herein by reference (FIG. 4). Bridge circuit 54 includes a first branch in which rearward sensor 20 is connected in series with biasing resistors 56 and 58 and a sensitivity-adjustment resistor 60. A second branch of bridge circuit 54 includes a forward-facing sensor 18 connected in series with a bias resistor 62 and in parallel with a limiting resistor 67. The two branches are combined in parallel with each other and in series with a modulation resistor 64. A pair of diodes 66a and 66b connect the branches to signal ground. A first output 68 of bridge circuit 54 is processed with an eye model 70 and provided as an input 72 to a subtracting amplifier 74. A second output 76 of circuit 54 is provided as the subtracting input to amplifier 74. Eye model 70 processes the signal on output 68 according to the physiological response of the eye and is disclosed in detail in commonly-assigned U.S. Pat. No. 4,793,690 issued to Gahan et al. for a REARVIEW MIRROR CONTROL CIRCUIT, the disclosure of which is hereby incorporated herein by reference. The output 52 of amplifier 74 supplies the drive signal to variable reflective element 12 in order to establish the light transmission level of the variable light transmission element thereof.

The signal on input 72 to amplifier 74 represents the light sensed by forward sensor 18, as modulated by the light sensed by rearward-facing sensor 20 and as filtered by eye model 70. The signal on input 72 is inverted by an inverter 78 and is provided as an input 80 to an adder circuit 82. The drive signal on line 52 is filtered by a time filter 84 and is provided as a second input 86 to adder circuit 82. Time filter 84 is designed to approximate the response time of variable reflective element 12 to changes in the drive signal level on output 52. In the illustrated embodiment, variable reflective element 12 is an electrochromic element which responds to voltages tending to color the element faster than it responds to signals tending to bleach the elements. As a result, time filter 84 has an asymmetric time constant, whereby it responds to signals tending to bleach element 12 with a 7.5-second time constant and it responds to signals tending to color element 12 with a three-second time constant.

Adder circuit 82 produces an output 88, which is the sum of the signals on its inputs 80 and 86. The signal on output 88 is provided as an input to a comparator 90 and is compared with a second input 91, which is produced by a multiple-slope oscillator 94. The signal on line 91 is illustrated as the waveform MS in FIG. 5. The signal MS on line 91 has a dual-slope rise time 230 wherein the signal rises at a fast rate in region F and at a slower rate in region S. Signal MS then falls at a substantially instantaneous rate back to a minimum threshold level during fall time 232. The result of combining signal MS on line 91 with output 88 of adder 82 by comparator 90 is a pulse-width modulated blanking signal 46, which is relatively constant in duty cycles for low values of the signal on line 88 but which rapidly increases to a relatively constant high duty cycle as the level of the signal on line 88 increases. The pulse-width modulated blanking signal on line 46 varies the intensity of mirror display 34. Signal 46 may additionally be supplied to a dashboard display 92 in order to vary the intensity of the dashboard display as a function of light conditions in the vicinity of the vehicle. Pulse-width modulated signal 46 may additionally be provided to heads-up displays and other displays in the vehicle (not shown). As the skilled artisan would recognize, appropriate time filtering to counter the effects of time filter 84 would be desirable in order to produce appropriate intensities in such dashboard display, heads-up display, or other display operated in this fashion.

Time filter 84 has a second input 85 which responds to an indication that variable reflective element 12 is being forced to a high reflectance condition. Such condition may result from the reflective element being turned off, the vehicle being placed in reverse gear or the like. Time filter 84 responds to such forced-bleach condition by producing a zero output on input 86 to adder 82. When a forced bleach indicator is applied to input 85, pulse-width modulated signal 46 is a function of only the light level sensed by circuit 50.

Figure 7:
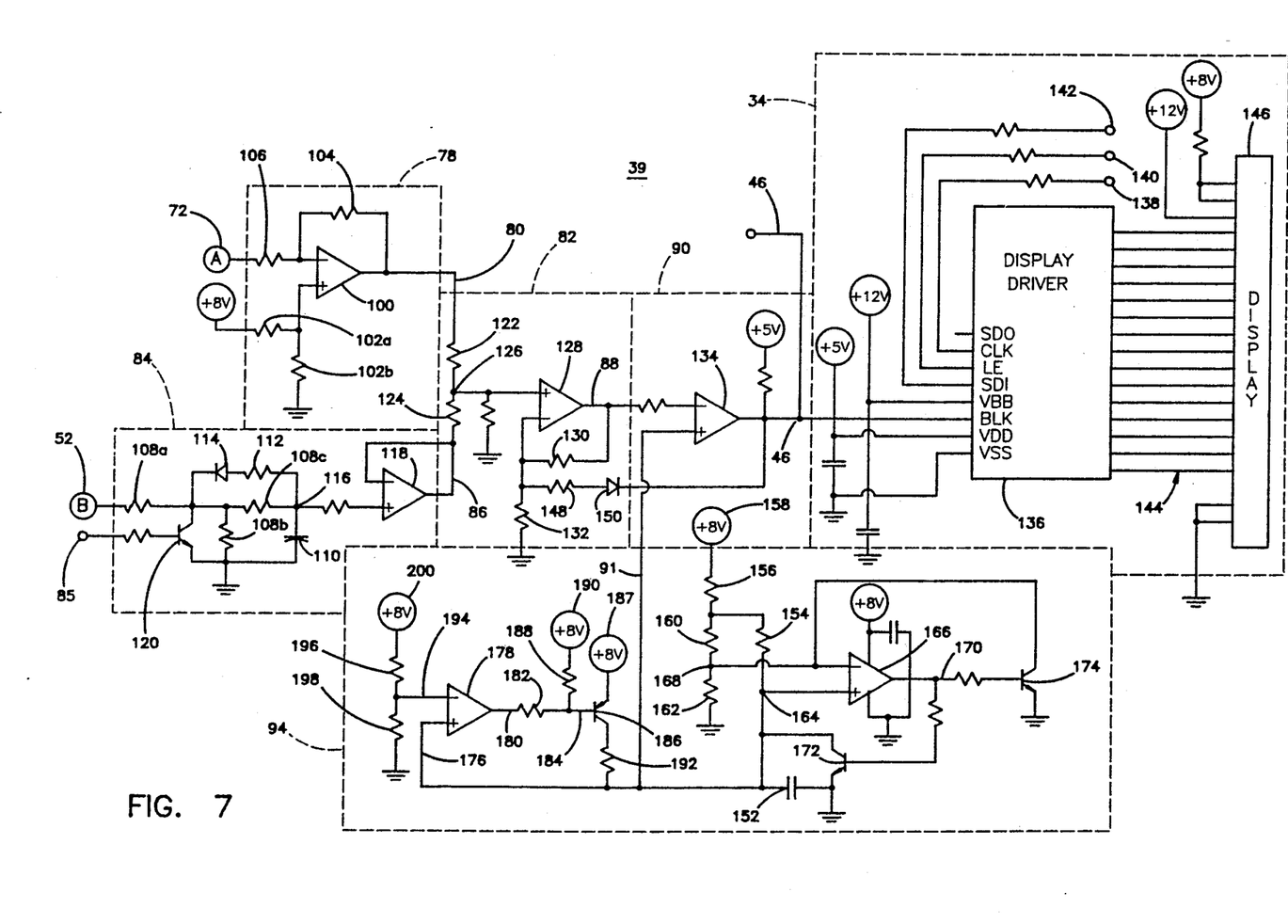
FIG. 7 is an electrical schematic diagram of the display control illustrated in FIG. 4.

Inverter 78 includes an operational amplifier 100 whose non-inverting input is connected to a voltage divider composed of resistors 102a and 102b in order to bias the operating level of amplifier 100 (FIG. 7). The inverting input of amplifier 100 is connected through a resistor 106 to the signal at input 72. The result is that the signal on input 80 to adder 82 increases in proportion to the level of light sensed by circuit 50. Time filter 84 includes a resistance network composed of resistors 108a, 108b and 108c with a capacitor 110 connected across resistors 108b and 108c. A branch including a resistor 112 and diode 114 establishes the asymmetric time constant function of time filter 84. The output of the resistance network at 116 is buffered with a unity gain amplifier 118 to produce the signal provided to input 86 of adder 82. A transistor 120 responds to a signal on forced-bleach input 85 by clamping the signal provided by time filter 84 to input 86 to a zero-voltage condition.

Adder circuit 82 includes a first summing resistor 122 extending from input 80 joined at a junction 126 with a second summing resistor 124 extending from input 86. Junction 126 is connected to the non-inverting input of an amplifier 128, whose gain is established by a feedback resistor 130 and a resistor 132 connected with signal ground. Output 88 of adder 82 is produced at the output of amplifier 128 and is provided to the inverting input of a comparator 134. The non-inverting input of comparator 134 is connected with line 91 which supplies the periodic signal MS from multiple-slope oscillator 94. The resulting output on line 46 is provided to the blanking input of a display driver circuit 136 A series resistor 148 and diode 150 connected between the output of comparator 134 and the inverting input of amplifier 128 establish hysteresis in order to prevent output 46 from being affected by spurious noise. Display driver 136 receives a clock input 138 and a chip select input 140 to enable a numerical value for mirror display 34 to be shifted to display driver 136. A serial out signal 142 is provided in order to supply serial bursts of digital data indicative of the displayed numerical values. Display driver 136 has a plurality of parallel output lines 144 in order to operate the display elements of a vacuum fluorescent indicator display panel 146.

The output signal on line 46 is pulse-width modulated in the range of between two percent (2%) (low display intensity) and 100% (high display intensity). The repetition rate of the pulse-width modulated signal 46 is approximately 400 Hz. Although the eye physiologically does not detect a flicker for repetition rates above 200 Hz, it was discovered that a "ghosting" effect is produced by observation, in the driver's peripheral vision, of display 34 when operated at 200 Hz. Accordingly, the pulse repetition rate is set at a higher frequency in order to avoid such a ghosting effect.

Multiple-slope oscillator 94 includes a capacitor 152, which is repetitively charged and discharged in order to establish the signal on output 91. Capacitor 152 is connected through a resistor 154 and 156 to a source of voltage at 158. Resistor 156 is connected in series with a pair of resistors 160 and 162 to signal ground. A junction 164 between capacitor 152 and resistor 154 is supplied as the non-inverting input to an operational amplifier 166, which is configured as a comparator. A junction 168 between resistors 160 and 162 is supplied as the inverting input to comparator 166. The output 170 of amplifier 166 is supplied to the bases of a pair of transistors 172 and 174. Transistor 172 is connected across capacitor 152. Transistor 174 is connected in series with junction 168 and, thus, the inverting input of amplifier 166.

Line 91 is additionally connected to the non-inverting input 176 of an operational amplifier, which is configured as a comparator 178. The output 180 of comparator 178 is connected through a resistor 182 to the base 184 of a PNP transistor 186. Base 184 is also connected through a resistor 188 to a source of voltage 190. The collector of transistor 186 is connected through a resistor 192 to line 91. The inverting input 194 of comparator 178 is connected to a reference voltage defined by a voltage divider composed of resistors 196 and 198 connected in series between a source of voltage 200 and signal ground.

Figure 5:
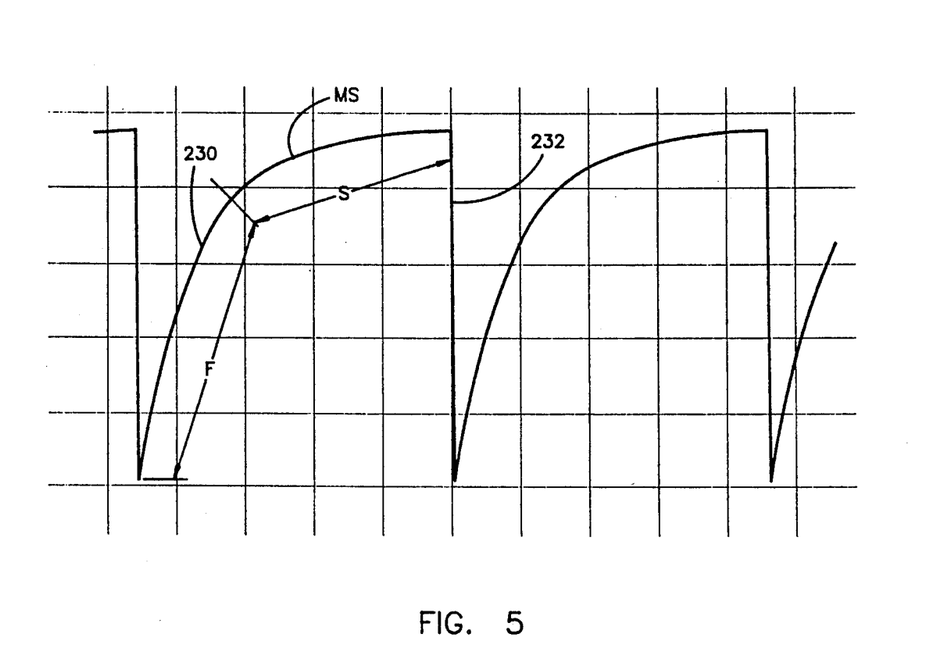
FIG. 5 is an amplitude versus time diagram of a multiple-slope oscillator signal useful with the invention.

Multiple-slope oscillator 94 operates as follows, referring to FIGS. 5 and 7. Capacitor 152 is charged by a first means from source 158 through resistors 154 and 156 producing the leading edge 230 of signal MS. When the voltage across capacitor 152 causes the inverting input at 164 of amplifier 166 to be greater than the fixed input at 168, output 170 switches and turns transistors 172 and 174 into a conducting condition. The result of causing transistor 174 to conduct is to pull inverting input 168 close to ground and the result of transistor 172 to conduct is to discharge capacitor 152. The combined result is that the voltage across capacitor 152 is rapidly discharged producing the trailing edge 232 of signal MS. When the voltage across capacitor 152 is fully discharged, output 170 of amplifier 166 is, again, switched low turning off transistors 172 and 174 This allows capacitor 152 to again charge through resistors 154 and 156.

During this initial charging of capacitor 152, input 176 of amplifier 178 is less than the reference input 194 causing output 180 to be low, which switches PNP transistor 186 into a conducting condition. This causes capacitor 152 to additionally be charged by a second means from source 187 through transistor 186 and resistor 192. This results in a rapid increase in the voltage across capacitor 152 during portion F of the rising edge 230 of signal MS. Once the voltage across capacitor 152 increases to the level of reference input 194, amplifier 178 switches its output to a high state which turns off transistor 186. After this point, capacitor 152 is charged only through the first means defined by resistors 154 and 156 and, thus, at a much slower rate during portion S of rising edge 230. Therefore, it is seen that the rising edge 230 of output 9 has dual slopes in which it increases during a first portion F at a rapid slope and at a much slower slope during a second portion S. The trailing edge 232 of waveform MS is substantially instantaneous.

Figure 8:
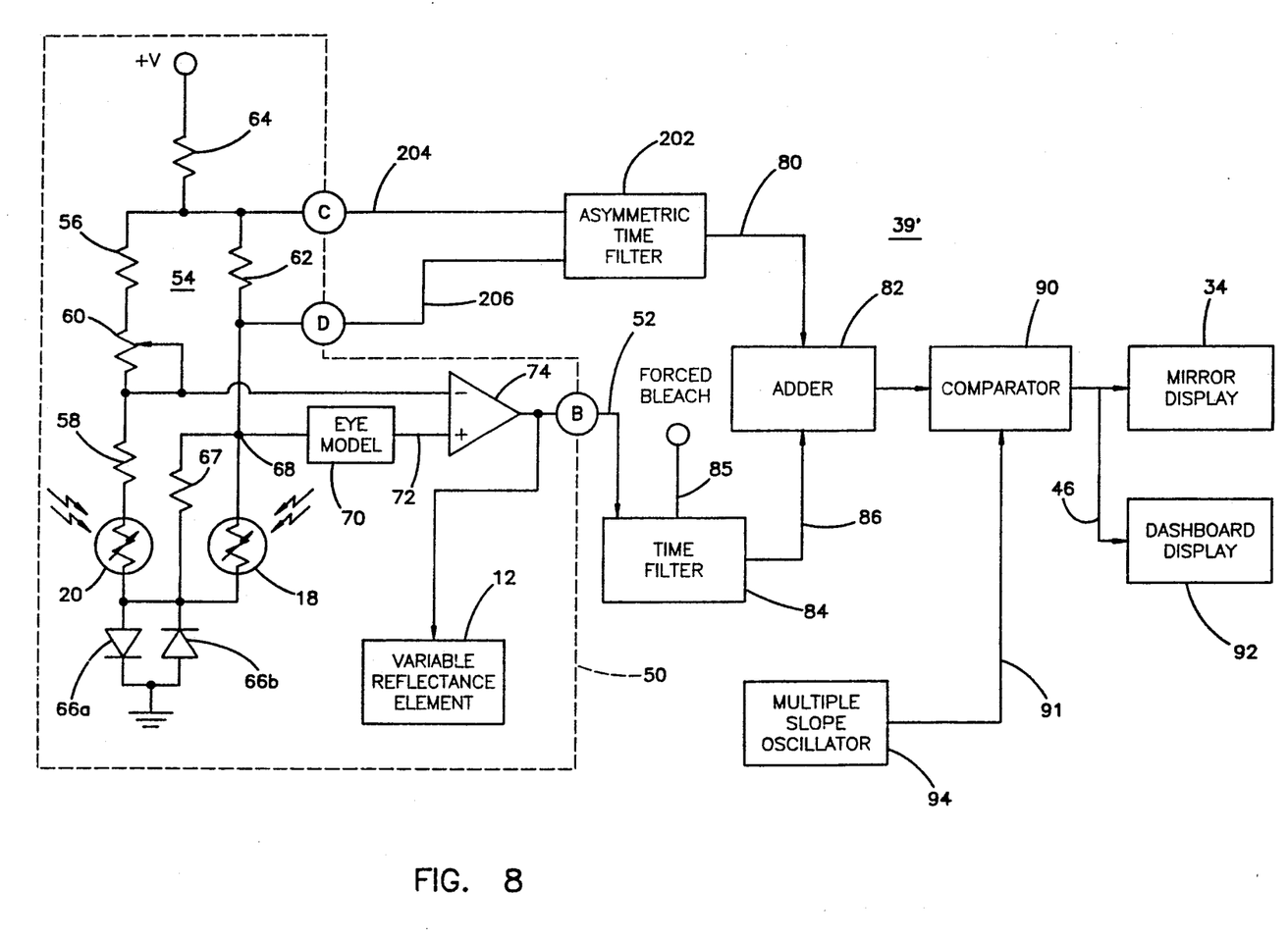
FIG. 8 is a block diagram of another embodiment of a display control according to the invention.

An alternative embodiment designated display control 39' is connected at points C and D across resistor 62 in series with forward light sensor 18 in bridge circuit 54 (FIG. 8). Display control circuit 39' includes an asymmetric time filter 202 having a first input 204 connected to point C and a second input 206 connected to point D. Time filter 202 provides a signal to input 80 of adder 82. Asymmetrical time filter 202 responds to increasing sensed light conditions sensed by circuit 50 independently of eye model 70. Asymmetric time filter 202 provides a cost effective means for obtaining a proper intensity level of mirror display 34 under all lighting conditions, even when rearview mirror system 10 is initially powered up. Thus, upon power-up, mirror display 34 will rapidly achieve a low intensity level in low lighting conditions and a high intensity in high lighting conditions.

Figure 9:
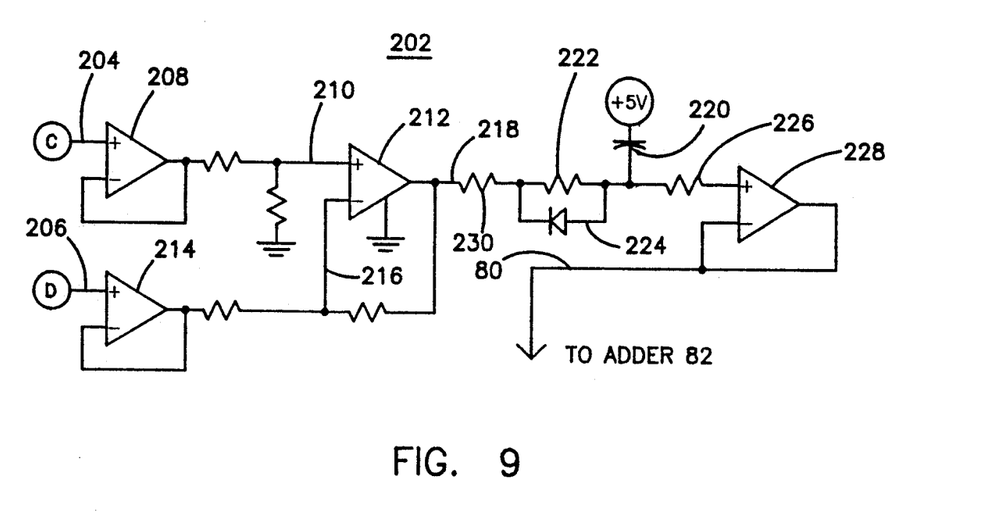
FIG. 9 is an electrical schematic diagram of a portion of the display control illustrated in FIG. 8.

Asymmetric time filter 202 includes a first buffer amplifier 208, which buffers the signal received on an input 204 in order to supply a signal to the non-inverting input 210 of a subtracting amplifier 212 (FIG. 9). Filter 202 additionally includes a buffer amplifier 214, which buffers the signal on an input 206 in order to supply a signal to the inverting input 216 of amplifier 212. Amplifier 212 produces an output 218, which is proportional to the voltage across resistor 62 in bridge 54. A filter circuit comprised of a capacitor 220, resistor 222 parallel with a diode 224 the signal on output 218. This signal is buffered by a buffer amplifier 228 in order to produce a signal for input 80.

Thus, it is seen that the present invention provides a control for controlling the intensity of a display in an automatic rearview mirror in a manner that creates optimum viewability by avoiding perceived changes in display intensity. The control takes into account the physiological response of the driver's eye to various sources of stimulus in order to eliminate any perceived changes in display intensity. Although the invention is illustrated as implemented with analog circuitry, it could readily be implemented with digital techniques as would be apparent to one of ordinary skill in the art. Other changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. A rearview mirror system for a vehicle comprising:
   a reflective element including a reflectance surface and a variable light transmission element;
   drive circuit means for supplying a drive signal to said reflective element in order to establish the light transmission level of said light transmission element;
   an optical display device behind said reflective element that produces a display having an intensity that is adapted to be viewed through said light transmission element; and
   a control including a light sensing means that is responsive to light conditions in the vicinity of said vehicle for producing a continuously variable light signal and an intensity control circuit means that is responsive to said light signal for varying the intensity of said optical display device as a function of the light conditions in the vicinity of said vehicle.

2. The rearview mirror system in claim 1 wherein said reflective element is an electrochromic element.

3. The rearview mirror system in claim 1 wherein said drive circuit means includes a light sensor adapted to sensing light in the vicinity of said vehicle and producing an output signal indicative of said light in the vicinity of said vehicle and means responsive to said output signal for producing said drive signal, wherein said light sensing means includes means responsive to said output signal for producing said light signal.

4. The rearview mirror system in claim 1 wherein said intensity control circuit varies the intensity of said optical display device as a non-linear function of the value of said light signal.

5. The rearview mirror system in claim 4 wherein said intensity control circuit provides a substantially constant low intensity of said optical display device for all values of sensed light below a first predetermined low light level.

6. The rearview mirror system in claim 5 wherein said intensity control circuit provides a substantially constant high intensity of said optical display device for all values of sensed light above a second predetermined high light level.

7. The rearview mirror system in claim 4 wherein said intensity control circuit provides a substantially constant high intensity of said optical display device for all values of sensed light above a predetermined high light level.

8. The rearview mirror system in claim 1 wherein said intensity control circuit provides a substantially constant low intensity of said optical display device for all values of sensed light below a first predetermined low light level.

9. The rearview mirror system in claim 8 wherein said intensity control circuit provides a substantially constant high intensity of said optical display device for all values of sensed light above a second predetermined high light level.

10. The rearview mirror system in claim 1 wherein said intensity control circuit provides a substantially constant high intensity of said optical display device for all values of sensed light above a predetermined high light level.

11. The rearview mirror system in claim 1 wherein said reflective element is a compass mirror.

12. The rearview mirror system in claim 1 wherein said optical display device is vacuum fluorescent.

13. A rearview mirror system for a vehicle comprising:
    a reflective element including a reflectance surface and a variable light transmission element;
    drive circuit means for supplying a drive signal to said reflective element in order to establish the light transmission level of said light transmission element;
    an optical display device behind said reflective element that produces a display having an intensity that is adapted to be viewed through said light transmission element; and
    a control including an intensity control circuit that varies the intensity of said optical display device as a function of the value of said drive signal in order to compensate said intensity for reduced light transmission levels of said light transmission element.

14. The rearview mirror system in claim 13 wherein said control further includes a light sensing means responsive to light conditions in the vicinity of said vehicle for producing a continuously variable light signal and wherein said intensity control circuit further varies the intensity of said optical display device as a function of the value of said light signal.

15. The rearview mirror system in claim 14 wherein said drive circuit means includes a light sensor adapted to sensing light in the vicinity of said vehicle and producing an output signal indicative of said light in the vicinity of said vehicle and means responsive to said output signal for producing said drive signal, wherein said light sensing means includes means responsive to said output signal for producing said light signal.

16. The rearview mirror system in claim 14 wherein said intensity control circuit varies the intensity of said optical display device as a non-linear function of the values of said drive signal and said light signal.

17. The rearview mirror system in claim 13 wherein said intensity control circuit includes a time filter having a time constant that is a function of the response characteristic of said reflective element in order to match changes to the intensity of said optical display device with changes to the light transmission level of the variable light transmission element resulting from changes in value of said drive signal.

18. The rearview mirror system in claim 17 wherein said variable light transmission element increases in light transmissivity at a different rate than said variable light transmission element decreases in light transmissivity and wherein said time filter has an asymmetrical time constant.

19. The rearview mirror system in claim 13 wherein said reflective element is an electrochromic element.

20. The rearview mirror system in claim 13 wherein said reflective element is a compass mirror.

21. The rearview mirror system in claim 13 wherein said optical display device is vacuum fluorescent.

22. A rearview mirror system for a vehicle comprising:
    a reflective element including a reflectance surface and a variable light transmission element;

drive circuit means for supplying a drive signal to said reflective element in order to establish the light transmission level of said light transmission element, said drive circuit means including light sensing means for sensing light in the vicinity of said vehicle and producing a light signal indicative of said light in the vicinity of said vehicle and means responsive to at least said light signal for producing said drive signal;

an optical display device behind said reflective element that produces a display having an intensity that is adapted to be viewed through said light transmission element; and control means responsive to said light signal and to said drive signal for varying the intensity of said optical display device as a function of the value of light in the vicinity of said vehicle and as a function of the light transmission level of said light transmission element.

23. The rearview mirror system in claim 22 wherein said control means produces a periodic blanking signal to disable said optical display device and wherein said control means varies the intensity of said optical display device by varying the duty cycle of said blanking signal.

24. The rearview mirror system in claim 23 wherein said blanking signal has a repetition rate of approximately 400 Hz.

25. The rearview mirror system in claim 22 wherein said control means includes first means responsive to said light signal for producing a first value that increases for increasing sensed light levels, second means responsive to said drive signal for producing a second value that increases for decreasing light transmission levels of said light transmission element and determining means responsive to the sum of said first and second values for determining the intensity of said optical display device.

26. The rearview mirror system in claim 25 wherein said determining means includes means for varying the intensity of said optical display device as a non-linear function of said sum.

27. The rearview mirror system in claim 2 wherein said determining means includes means for generating a multiple-sloped waveform and means for combining said waveform and said sum in order to produce a pulse-width modulated signal.

28. The rearview mirror system in claim 25 wherein said second means includes a time filter having a time constant that is a function of a response characteristic of said reflective element in order to match changes to the intensity of said optical display device with changes to the light transmission level of the variable light transmission element resulting from changes in value of said drive signal.

29. The rearview mirror system in claim 28 wherein said variable light transmission element increases in light transmissivity at a different rate than said variable light transmission element decreases in light transmissivity and wherein said time filter has an asymmetrical time constant.

30. The rearview mirror system in claim 22 wherein said reflective element is an electrochromic element.

31. The rearview mirror system in claim 22 including forced-bleach input means for receiving an indication that said light transmission element is being forced into a high light transmission condition and override means responsive to said indication for causing said control means to vary the intensity of said optical display device only as a function of said value of light in the vicinity of said vehicle.

32. The rearview mirror system in claim 22 wherein said control means provides an output signal for varying the intensity of another vehicle display device as a function of at least the value of light in the vicinity of said vehicle.

33. The rearview mirror system in claim 22 wherein said reflective element is a compass mirror.

34. The rearview mirror system in claim 22 wherein said optical display device is vacuum fluorescent.

35. A rearview mirror system for a vehicle comprising:

a reflective element including a reflectance surface and a variable light transmission element;

drive circuit means for supplying a drive signal to said reflective element in order to establish the light transmission level of said light transmission element;

a light sensor adapted to sensing light conditions in the vicinity of said vehicle and producing a light signal indicative of at least said light conditions;

an optical display device behind said reflective element that produces a display having an intensity that is adapted to be viewed through said light transmission element; and control means responsive to said light signal for varying the intensity of said optical display device as a function of the value of light sensed by said light sensor including non-linear processing means for producing a periodic blanking signal as a non-linear function of said light signal and means responsive to said blanking signal for disabling said optical display device, whereby said control means varies the intensity of said optical display device by varying the duty cycle of said blanking signal.

36. The rearview mirror system in claim 35 wherein said blanking signal has a repetition rate of approximately 400 Hz.

37. The rearview mirror system in claim 35 wherein said non-linear processing means includes a multiple-slope oscillator that is adapted to producing a repetitive signal having one of a rising waveform and a falling waveform that has multiple-slope values, and a combining circuit for combining said repetitive signal with said light signal to produce said blanking signal.

38. The rearview mirror system in claim 37 wherein said one of a rising waveform and a falling waveform has first and second regions of substantially constant slope in order to provide a substantially constant first intensity of said optical display device for all values of said light signal above a predetermined level and substantially constant second intensity of said optical display device for all values of said light signal below a predetermined level.

39. The rearview mirror system in claim 35 wherein said reflective element is an electrochromic element.

40. The rearview mirror system in claim 35 wherein said control means provides an output signal for varying the intensity of another vehicle display device as a function of at least the value of said light signal.

41. The rearview mirror system in claim 35 wherein said reflective element is a compass mirror.

42. The rearview mirror system in claim 35 wherein said optical display device is vacuum fluorescent.

43. A rearview mirror system for a vehicle comprising:

a reflective element including a reflectance surface and a variable light transmission element;

drive circuit means for supplying a drive signal to said reflective element in order to establish the light transmission level of said light transmission element;

a light sensor adapted to sensing light conditions in the vicinity of said vehicle and producing a light signal representative of said light conditions;

an optical display device behind said reflective element that produces a display having an intensity that is adapted to be viewed through said light transmission element;

control means responsive to said light signal and to said drive signal for varying the intensity of said optical display device as a function of the value of light in the vicinity of said vehicle and as a function of the light transmission level of said light transmission element, wherein said control means produces a periodic blanking signal to disable said optical display device, whereby said control means varies the intensity of said optical display device by varying the duty cycle of said blanking signal; and said control means including first means responsive to said light signal for producing a first value that increases for increasing sensed light levels, second means responsive to said drive signal for producing a second value that increases for decreasing light transmission levels of said light transmission element, summing means responsive to the sum of said first and second values for producing a composite value, and non-linear processing means for processing said composite value to said blanking signal.

44. The rearview mirror system in claim 43 wherein said blanking signal has a repetition rate of approximately 400 Hz.

45. The rearview mirror system in claim 43 wherein said non-linear processing means includes a multiple-slope oscillator that is adapted to producing a repetitive signal having one of a rising waveform and a falling waveform that has multiple-slope values, and a combining circuit for combining said repetitive signal with said composite value to produce said blanking signal.

46. The rearview mirror system in claim 45 wherein said one of a rising waveform and a falling waveform has first and second regions of substantially constant slope in order to provide a substantially constant first intensity of said optical display device for all values of said composite value above a predetermined level and substantially constant second intensity of said optical display device for all values of said composite value below a predetermined level.

47. The rearview mirror system in claim 43 wherein said second means includes a time filter having a time constant that is a function of the response characteristic of said reflective element in order to match changes to the intensity of said optical display device with changes to the light transmission level of the variable light transmission element resulting from changes to said drive signal.

48. The rearview mirror system in claim 47 wherein said variable light transmission element increases in light transmissivity at a different rate than said variable light transmission element decreases in light transmissivity and wherein said time filter has an asymmetrical time constant.

49. The rearview mirror system in claim 43 wherein said reflective element is an electrochromic element.

50. The rearview mirror system in claim 43 including forced-bleach input means for receiving an indication that said light transmission element is being forced into a high light transmission condition and override means responsive to said indication for causing said control means to vary the intensity of said optical display device only as a function of light conditions in the vicinity of said vehicle sensed by said light sensor.

51. The rearview mirror system in claim 43 wherein said control means provides an output signal for varying the intensity of another vehicle display device as a function of at least the value of light conditions in the vicinity of said vehicle sensed by said light sensor.

52. The rearview mirror system in claim 43 wherein said reflective element is a compass mirror.

53. The rearview mirror system in claim 43 wherein said optical display device is vacuum fluorescent.

54. A rearview mirror system for a vehicle comprising:

a reflective element including a reflectance surface and a variable light transmission element;

drive circuit means for supplying a drive signal to said reflective element in order to establish the light transmission level of said light transmission element, said drive circuit means including light sensing means for sensing light in the vicinity of said vehicle and producing a light signal indicative of said light in the vicinity of said vehicle and means responsive to at least said light signal for producing said drive signal;

an optical display device behind said reflective element that produces a display having an intensity that is adapted to be viewed through said light transmission element; and control means responsive to said light signal for varying the intensity of said optical display device as a function of the value of light in the vicinity of said vehicle.

55. The rearview mirror system in claim 54 wherein said control means produces a periodic blanking signal to disable said optical display device and wherein said control means varies the intensity of said optical display device by varying the duty cycle of said blanking signal.

56. The rearview mirror system in claim 55 wherein said blanking signal has a repetition rate of approximately 400 Hz.

57. The rearview mirror system in claim 55 wherein said control means includes processing means for varying the intensity of said optical display device as a non-linear function of said light signal.

58. The rearview mirror system in claim 57 wherein said processing means includes means for generating a multiple-sloped waveform and means for combining said waveform and said sum in order to produce a pulse-width modulated signal.

59. The rearview mirror system in claim 54 wherein said reflective element is an electrochromic element.

60. The rearview mirror system in claim 54 wherein said control means provides an output signal for varying the intensity of another vehicle display device as a function of at least the value of light in the vicinity of said vehicle.

61. The rearview mirror system in claim 54 wherein said reflective element is a compass mirror.

62. The rearview mirror system in claim 1 wherein said optical display device is vacuum fluorescent.

* * * * *

UNITED STATES PATENT AND TRADEMARK OFFICE
CERTIFICATE OF CORRECTION

PATENT NO. : 5,285,060
DATED : February 8, 1994
INVENTOR(S) : Mark L. Larson et al.

It is certified that error appears in the above-indentified patent and that said Letters Patent is hereby corrected as shown below:

On the title page, item [57],

Abstract, line 28
After "high light." insert --level--.

Column 7, line 3
After "136" insert --.--;

Column 8, line 2
After "174" insert --.--;

Column 8, line 20
"output 9" should be --output 91--;

Column 11, Claim 27, line 42
"claim 2" should be --claim 25--.

Signed and Sealed this

Fourth Day of October, 1994

*Attest:*

BRUCE LEHMAN

*Attesting Officer*     *Commissioner of Patents and Trademarks*